United States Patent
Sorokine et al.

(10) Patent No.: US 8,706,785 B2
(45) Date of Patent: Apr. 22, 2014

(54) COMMUNICATION SYSTEM WITH SIGNAL PROCESSING MECHANISM AND METHOD OF OPERATION THEREOF

(75) Inventors: Vladislav Sorokine, Del Mar, CA (US); Jungwon Lee, San Diego, CA (US); Sungsoo Kim, San Diego, CA (US); Inyup Kang, San Diego, CA (US)

(73) Assignee: Samsung Electronics Co., Ltd., Gyeonggi-Do (KR)

(*) Notice: Subject to any disclaimer, the term of this patent is extended or adjusted under 35 U.S.C. 154(b) by 525 days.

(21) Appl. No.: 13/163,661

(22) Filed: Jun. 17, 2011

(65) Prior Publication Data

US 2012/0209900 A1 Aug. 16, 2012

Related U.S. Application Data

(60) Provisional application No. 61/443,238, filed on Feb. 15, 2011.

(51) Int. Cl.
*G06F 17/10* (2006.01)

(52) U.S. Cl.
USPC .......................................................... 708/309

(58) Field of Classification Search
CPC ...... G06F 17/10; H04Q 1/4575; G01R 23/02; G01R 23/167; G01S 19/36
USPC .................................................... 708/300–322
See application file for complete search history.

(56) References Cited

U.S. PATENT DOCUMENTS

| | | | |
|---|---|---|---|
| 6,072,782 A | 6/2000 | Wu | |
| 6,512,789 B1 * | 1/2003 | Mirfakhraei | 708/323 |
| 7,421,029 B2 | 9/2008 | Yasotharan et al. | |
| 7,639,738 B2 | 12/2009 | Lopez de Victoria | |
| 7,804,765 B2 | 9/2010 | Tzannes et al. | |
| 8,098,751 B2 * | 1/2012 | Shattil | 375/260 |
| 2009/0022252 A1 | 1/2009 | Goh et al. | |

* cited by examiner

*Primary Examiner* — Tan V. Mai
(74) *Attorney, Agent, or Firm* — IP Investment Law Group

(57) ABSTRACT

A method of operation of a communication system includes: generating a filter impulse response and a filter time-domain data with a shortening filter; generating a filter frequency response based on the filter impulse response with a filter frequency response calculator; generating a filter frequency-domain data based on the filter time-domain data with a first process unit; and generating a raw channel impulse response with a filter frequency removal unit for removing the filter frequency response from the filter frequency-domain data.

20 Claims, 5 Drawing Sheets

COMMUNICATION SYSTEM WITH SIGNAL PROCESSING MECHANISM AND METHOD OF OPERATION THEREOF

CROSS-REFERENCE TO RELATED APPLICATION

This application claims the benefit of U.S. Provisional Patent Application Ser. No. 61/443,238 filed Feb. 15, 2011, and the subject matter thereof is incorporated herein by reference thereto.

TECHNICAL FIELD

The present invention relates generally to a communication system and more particularly to a system with signal processing mechanism.

BACKGROUND ART

A cellular network is a radio network distributed over land areas called cells, each served by at least one fixed-location transceiver known as a cell site or base station. When joined together, these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

4G stands for the fourth generation of cellular wireless standards. It is a successor to third generation (3G) and second generation (2G) families of cellular wireless standards. A 4G system is expected to provide a comprehensive and secure all-Internet Protocol (IP) based mobile broadband solution to smartphones, laptop computer wireless modems, and other mobile devices. Facilities such as ultra-broadband Internet access, IP telephony, gaming services, and streamed multimedia may be provided to users.

Thus, a need still remains for reliable and fast cellular networks. In view of the shrinking amount of available frequencies, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a communication system, including: generating a filter impulse response and a filter time-domain data with a shortening filter; generating a filter frequency response based on the filter impulse response with a filter frequency response calculator; generating a filter frequency-domain data based on the filter time-domain data with a first process unit; and generating a raw channel impulse response with a filter frequency removal unit for removing the filter frequency response from the filter frequency-domain data.

The present invention provides a communication system, including: a shortening filter for generating a filter impulse response and a filter time-domain data; a filter frequency response calculator, coupled to the shortening filter, for generating a filter frequency response based on the filter impulse response; a first process unit, coupled to the shortening filter, for generating a filter frequency-domain data based on the filter time-domain data; and a filter frequency removal unit, coupled to the filter frequency response calculator, for generating a raw channel impulse response with the filter frequency response removed from the filter frequency-domain data.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
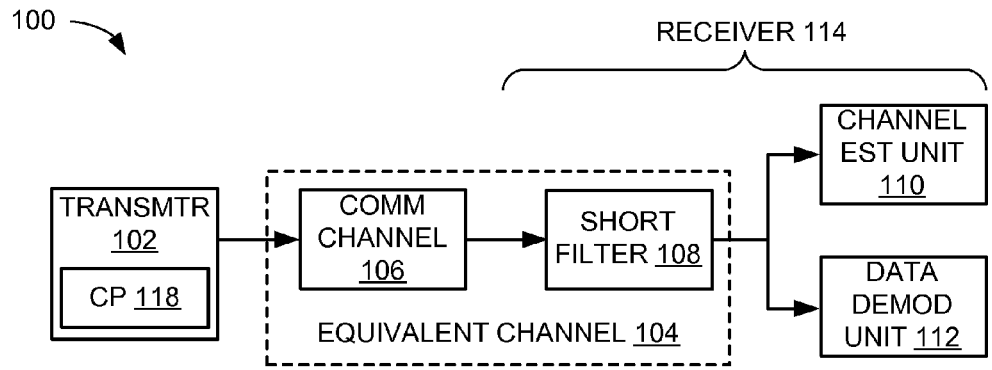
FIG. 1 is a hardware block diagram of dataflow of a communication system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

Referring now to FIG. 1, therein is shown a hardware block diagram of dataflow of a communication system 100 in an embodiment of the present invention. The communication system 100 can represent an orthogonal frequency-division multiplexing (OFDM) system.

The communication system 100 can include a transmitter 102 coupled to an equivalent channel 104. The transmitter 102 is defined as equipment that is used for transmission of electrical signals. The equivalent channel 104 is defined as a data path having a channel response with interferences removed.

The equivalent channel 104 can include a communication channel 106 and a shortening filter 108. A response of the equivalent channel 104 can include a convolution of an impulse response of the communication channel 106 and an impulse response of the shortening filter 108.

The communication channel 106 can include signal impairments including inter-symbol interference. The signal impairments can be subsequently minimized in the equivalent channel 104 by inclusion of the shortening filter 108.

The response of the equivalent channel 104 can subsequently be sent to a channel estimation unit 110 and a data demodulation unit 112 for further processing. Outputs of the channel estimation unit 110 to be used for calculation of coefficients of the shortening filter 108 provide a new and improved algorithm resulting in improvement for communication systems that do not have training sequences for calculation of coefficients. The channel estimation unit 110 and the data demodulation unit 112 will be subsequently described.

The communication system 100 can include a receiver 114, which is defined as equipment that is used for reception of electrical signals. The block diagram depicts a portion of the receiver 114 including the shortening filter 108, the channel estimation unit 110, and the data demodulation unit 112. The receiver 114 can be connected to the transmitter 102 through the communication channel 106. For example, the receiver 114 can represent an orthogonal frequency-division multiplexing receiver or a receiving unit in a modem.

The communication channel 106 is defined as a data path including a network having wireless communication, wired communication, optical, ultrasonic, or a combination thereof. For example, the wireless communication can include satellite communication, cellular communication, Bluetooth, Infrared Data Association standard (IrDA), wireless fidelity (Wi-Fi), and worldwide interoperability for microwave access (WiMAX). Also for example, the wired communication can include Ethernet, digital subscriber line (DSL), fiber to the home (FTTH), and plain old telephone service (POTS). For a specific example, the communication channel 106 can represent a physical channel.

The shortening filter 108 is defined as an electronic device that eliminates interferences including inter-symbol interference (ISI) and inter-carrier interference (ICI). The shortening filter 108 reduces power of channel taps outside a cyclic prefix 118, denoted as CP. The cyclic prefix 118 is defined as an interval added to the beginning of a symbol in a data frame from the transmitter 102. The power of the channel taps is a function of the channel taps' magnitudes. For example, if the power is less than a predetermined power threshold, the channel taps can have less impact on a channel output signal, and thus the channel taps can be discarded.

The interval having repetition of the end of the symbol allows linear convolution of a frequency-selective multipath channel to be modeled as circular convolution, which in turn can be transformed to a frequency domain. For example, the shortening filter 108 can represent a time-domain digital filter, a time-domain shortening filter, a time-domain equalizer (TEQ), or an adaptive filter.

The present invention can include methods including maximum shortening signal-to-noise ratio (MSSNR) optimization to improve channel shortening filter efficiency. Maximum Shortening Signal-To-Noise Ratio can maximize an energy within a certain window of h(n)*w(n) while constraining an energy in a remainder, where "h(n)" denotes an impulse response of the communication channel 106, "*" denotes convolution, and "w(n)" denotes an impulse response of the shortening filter 108.

The present invention can take into account a new criterion, which is called symbol-to-interference ratio (SIR), related to interference terms for channel taps in the response of the communication channel 106 of the equivalent channel 104 that fall outside the cyclic prefix 118. As such, the coefficients of the shortening filter 108 can be calculated based on a matrix Eigenvalue method.

The interference terms can be resulting from the inter-symbol interference and the inter-carrier interference. For example, the channel taps in the response of the equivalent channel 104 that are outside the cyclic prefix 118 can be weighted by an interference term for a given tap delay.

For example, the goal of the present invention with the symbol-to-interference ratio is to maximize the quantity in Equation 1 below.

$$SIR = \frac{\text{power of } taps_{inside\ CP}}{\text{weighted power of } taps_{outside\ CP}} \quad (1)$$

Also for example, consider the communication channel 106 with a channel matrix H. Let a diagonal interference matrix denoted as I, and an impulse response of the shortening filter 108 denoted as w. In addition, let a portion of the channel matrix that contains channel taps within a design window, denoted as D, and shorter than or equal to the cyclic prefix 118 denoted as Hwin, and channel taps outside the design window denoted as Hwall. The symbol-to-interference ratio can be formulated as follows in Equation 2 below.

$$SIR = \frac{w^T H_{win}^T H_{win} w}{w^T I^T H_{wall}^T H_{wall} I w} \quad (2)$$

The interference terms for the channel taps outside terms of the cyclic prefix 118 can be proportional to an excess delay, which can be expressed as I α (tap_delay−cyclic_prefix), where I is the diagonal interference matrix, α denotes proportional to, the quantity of tap_delay−cyclic_prefix is the excess delay, and tap_delay is a delay of the channel taps outside the cyclic cycle. An optimization problem can be solved with the formula in Equation 2 above by finding an impulse response of the shortening filter 108 (w) such that the symbol-to-interference ratio is maximized.

One such method for finding an impulse response of the shortening filter 108 can be described as follows.

Let A and B be expressed as:

$$A = I^T H_{wall}^T H_{wall} I \quad (3)$$

$$B = H_{wall}^{win} H_{win} \quad (4)$$

Also, let y be expressed as:

$$y = \sqrt{A}^T w \quad (5)$$

Then, an impulse response of the shortening filter 108 can be calculated in Equation 6 below.

$$w = (\sqrt{A^T})^{-1} y \qquad (6)$$

Let matrix C be expressed as:

$$C = (\sqrt{A})^{-1} B (\sqrt{A^T})^{-1} \qquad (7)$$

An optimal shortening solution can be determined by finding or calculating a vector y such that $y^T C y$ is maximized, with a constraint of $y^T y = 1$. The vector y can be given by y=lmax, where lmax is the eigenvector of C corresponding to its maximum Eigenvalue. Then, an impulse response of the shortening filter 108 can be calculated from y.

An alternative embodiment of the present invention can include modifying weights of the channel taps to account for correlation of interferences between the channel taps. Another alternative embodiment can include selecting all or a few of the channel taps in the calculation of maximum symbol-to-interference ratio.

Other embodiments can include simplifying calculation of an impulse response of the shortening filter 108 by taking into account circular structure of the channel matrix H, and conditioning the shortening filter 108 in a time-domain data path in the receiver 114. The conditioning of the shortening filter 108 can be based on strength of interference terms by applying or turning on the shortening filter 108 only when interference is sufficiently strong or when certain conditions are met.

Since the channel taps within the cyclic prefix 118 have no ISI or ICI interference, calculation of the coefficients of the shortening filter 108 can be improved by taking into account only the interference terms for the channel taps outside the cyclic prefix 118. The channel taps in the response of the equivalent channel 104 that are outside the cyclic prefix 118 can be forced or set to smaller magnitudes for improvement in system performance, such as bit-error performance, frame-error performance, and system throughput. For example, the channel taps outside the cyclic prefix 118 set to smaller magnitudes can improve wireless modem performance under channel conditions with long delay spreads.

Each of blocks described above including the transmitter 102 and the receiver 114, having the shortening filter 108, the channel estimation unit 110, and the data demodulation unit 112, can be implemented in hardware, software, or a combination thereof. For example, each of the blocks can be implemented in hardware, hardware with a processor, or a processor with hardware accelerator blocks in the processor.

It has been discovered that the shortening filter 108 having the symbol-to-interference ratio criterion eliminates signal quality degradation, resulting from the interferences in the communication channel 106, thereby improving system-level performance over communication systems having maximum shortening signal to noise ratio based criteria.

It has also been discovered that forcing or setting the channel taps in the response of the equivalent channel 104 that are outside the cyclic prefix 118 to smaller magnitudes improves system performance resulting in less inter-symbol interference and inter-carrier interference as well as increasing tolerances for errors and noise in the communication channel 106 compared to existing methods including minimum mean squared error (MMSE), maximum shortening signal to noise ratio, and blind channel estimation.

Figure 2:
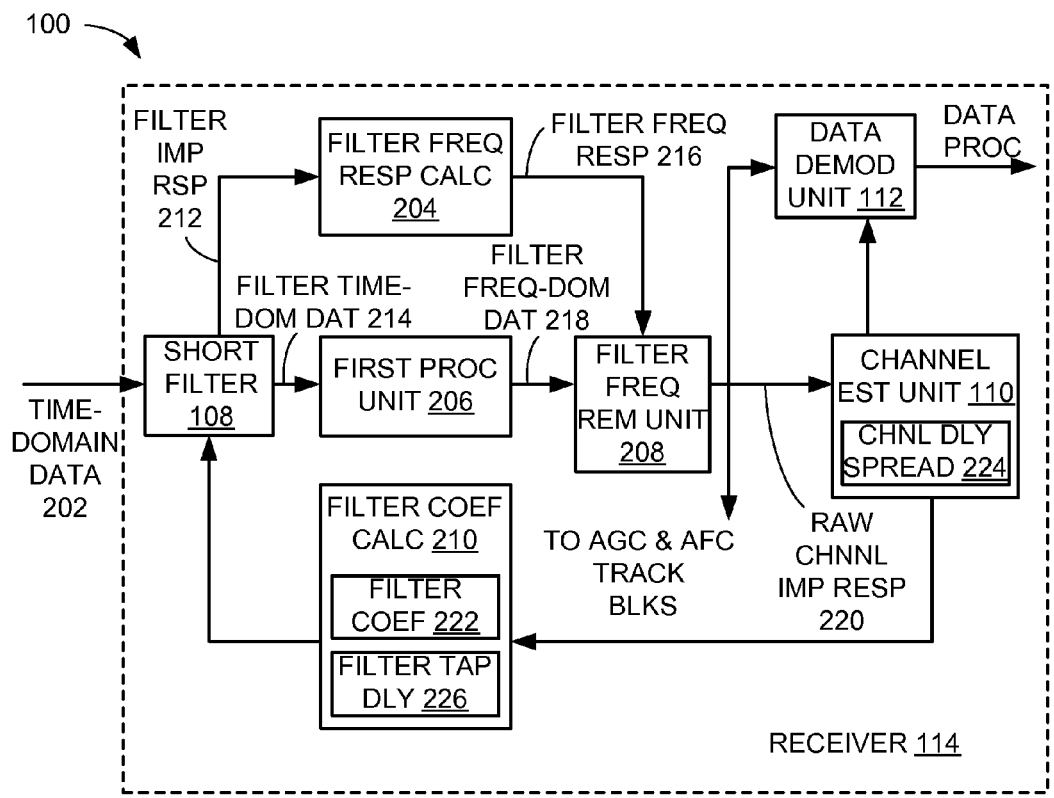
FIG. 2 is a detailed hardware block diagram of dataflow of the communication system.

Referring now to FIG. 2, therein is shown a detailed hardware block diagram of dataflow of the communication system 100. The communication system 100 provides a solution to a channel-shortening problem in orthogonal frequency-division multiplexing cellular systems that do not have suitable or special training sequences to obtain channel estimation for calculation of the coefficients of the shortening filter 108. For example, the orthogonal frequency-division multiplexing cellular systems can represent a long-term evolution (LTE) system.

The communication system 100 can include the receiver 114 having the shortening filter 108. The receiver 114 can include a filter frequency response calculator 204 and a first process unit 206, both of which can be coupled to the shortening filter 108. The shortening filter 108 can be inserted in the data stream prior to the first process unit 206.

The filter frequency response calculator 204 is defined as a logical component that determines a frequency response, denoted as wn[m], of an impulse response of the shortening filter 108. The filter frequency response calculator 204 can be implemented with a transform method including fast Fourier transform (FFT).

The filter frequency response calculator 204 can be implemented in hardware (HW), software, or a combination thereof. For example, the filter frequency response calculator 204 can be implemented with a coordinate rotation digital computer (CORDIC) with software applications for programmability.

The first process unit 206 is defined as a logical component that determines frequency components based on discrete data values from an output of the shortening filter 108. The first process unit 206 can perform a frequency transformation of a time-domain received signal from the output of the shortening filter 108.

For example, the first process unit 206 can include a function or a method including fast Fourier transform. Also for example, the first process unit 206 can represent a fast Fourier transform block.

The receiver 114 can include a filter frequency removal unit 208, coupled to the filter frequency response calculator 204 and the first process unit 206. The filter frequency removal unit 208 is defined as a logic component that removes a frequency response of the shortening filter 108 from the output of the first process unit 206.

The receiver 114 can include a filter coefficient calculator 210, coupled to the channel estimation unit 110 and the shortening filter 108. The filter coefficient calculator 210 is defined as a logic component that determines filter coefficients 222 of the shortening filter 108.

The filter coefficients 222 are defined as a set of constants, also called tap weights, used to multiply against delayed signal sample values within a digital filter structure. The filter coefficients 222 can be sent to the shortening filter 108.

The shortening filter 108 can generate and send a filter impulse response 212 to the filter frequency response calculator 204. The filter impulse response 212 is defined as an impulse response of the shortening filter 108.

The shortening filter 108 can receive a time-domain data 202, which is defined as a response of the communication channel 106 of FIG. 1 in time domain, denoted as y[k]. The shortening filter 108 can generate and send a filter time-domain data 214 to the first process unit 206.

The filter time-domain data 214 is defined as information from the time-domain data 202 with interferences filtered from the time-domain data 202 by the shortening filter 108. The interferences can be filtered by the shortening filter 108 removing the interferences from the time-domain data 202 for subsequent processing of channel estimation and data demodulation. For example, the interferences can include the inter-symbol interference and the inter-carrier interference.

The filter frequency response calculator 204 can generate and send a filter frequency response 216, depicted as wn[m], to the filter frequency removal unit 208. The filter frequency response 216 is defined as the filter impulse response 212 converted to frequency domain.

The filter frequency response 216 can be generated by the filter frequency response calculator 204 transforming the filter impulse response 212 from time domain to frequency domain. The filter frequency removal unit 208 can be implemented as a canceller or an inversion of the filter frequency response 216 calculated by the filter frequency response calculator 204.

The first process unit 206 can generate and send a filter frequency-domain data 218 to the filter frequency removal unit 208. The filter frequency-domain data 218 is defined as the filter time-domain data 214 converted to frequency domain. The filter frequency-domain data 218 can be generated by the first process unit 206 transforming the filter time-domain data 214 from time domain to frequency domain.

The filter frequency removal unit 208 can generate and send a raw channel impulse response 220 to the channel estimation unit 110 and the data demodulation unit 112. The raw channel impulse response 220 is defined as a response of the equivalent channel 104 of FIG. 1 without an effect of the operation of the shortening filter 108. The raw channel impulse response 220 can be sent to other blocks, such as automatic gain control (AGC) and automatic frequency control (AFC) tracking blocks, in the receiver 114.

The raw channel impulse response 220 can be generated by the filter frequency removal unit 208 cancelling or removing the filter frequency response 216 from the filter frequency-domain data 218 thereby providing shortening filter transparency to subsequent processing modules. Removal of the filter frequency response 216 from the filter frequency-domain data 218 can be performed by dividing the filter frequency-domain data 218 by the filter frequency response 216.

The filter frequency removal unit 208 can deliver the raw channel impulse response 220 after cancellation of the filter frequency response 216 is performed by the filter frequency removal unit 208. The cancellation of the filter frequency response 216 allows insertion of the shortening filter 108 in the time-domain data stream to be transparent to blocks in the receiver 114 thereby providing an effective shortening filter implementation with low complexity since minimal modification to the receiver 114 is required.

The filter frequency removal unit 208 can be implemented in hardware, software, or a combination thereof. For example, the filter frequency removal unit 208 can be implemented with a coordinate rotation digital computer with software applications for programmability.

The receiver 114 can include the data demodulation unit 112, coupled to the filter frequency removal unit 208, to detect and extract modulation signals from the raw channel impulse response 220. The receiver 114 can include the channel estimation unit 110, coupled to the filter frequency removal unit 208, the filter coefficient calculator 210, and the data demodulation unit 112.

The channel estimation unit 110 is defined as a logical component that calculates a channel impulse response of a received signal and equalizes the channel impulse response in the frequency domain. The communication system 100 can deploy the channel estimation unit 110 to facilitate demodulation of the raw channel impulse response 220 by the data demodulation unit 112.

The operation of the shortening filter 108 does not affect blocks in the receiver 114 that are sensitive to gains or delays in the time-domain data path due to the cancellation of the frequency response of the impulse response of the shortening filter 108 in the frequency domain. The blocks unaffected by the operation of the shortening filter 108 can include automatic gain control and automatic frequency control.

If the shortening filter 108 and the filter frequency removal unit 208 are not used or are turned off, the channel impulse response is a raw channel impulse response of the communication channel 106. If the shortening filter 108 and the filter frequency removal unit 208 are used or are turned on, the channel impulse response is an impulse response of the equivalent channel 104.

The channel estimation unit 110 can evaluate a channel delay spread 224 from the communication channel 106 if the shortening filter 108 is disabled or from the equivalent channel 104 if the shortening filter 108 is enabled. The channel delay spread 224 is defined as a maximum time difference between a reflected signal and a main (direct) signal as seen by the receiver 114. The channel delay spread 224 can represent a delay of the time-domain data 202 from the main signal to the reflected signal.

If the shortening filter 108 is disabled, the channel delay spread 224 can represent a delay spread of the communication channel 106. If the shortening filter 108 is enabled, the channel delay spread 224 can represent a raw delay spread of the equivalent channel 104.

The filter coefficient calculator 210 can receive inputs from the channel estimation unit 110 including raw channel impulse response taps. The filter coefficient calculator 210 can generate outputs to the shortening filter 108 including the filter coefficients 222. The filter coefficients 222 can be calculated in a manner such that the taps of the response of the equivalent channel 104 outside the cyclic prefix 118 of FIG. 1 are minimized according to a certain metric including a magnitude or a weighted magnitude. The cyclic prefix 118 can be determined by processing the time-domain data 202 or can be communicated to the receiver 114 by the transmitter 102 by higher-level signaling.

Reference or pilot signals present in the long-term evolution system can be used for the channel estimation by the channel estimation unit 110 and subsequently, for calculation of the filter coefficients 222 by the filter coefficient calculator 210. In an alternative embodiment, synchronization signals embedded in the received data, depicted as the time-domain data 202, present in the long-term evolution system can be used for the channel estimation and calculation of the filter coefficients 222.

Schemes of the channel estimation by the channel estimation unit 110 can differ in timing resolution or implementation complexity compared to other schemes. The channel estimation can be determined for calculation of the filter coefficients 222.

For example, the channel estimation can be obtained by estimation methods with training sequences, reference or primary synchronizing signals, or secondary synchronizing signals. For a specific example, in an alternative embodiment, training symbols can be used to train the shortening filter 108 with the training symbols provided in the data transmission of a system including a Digital Subscriber Line system.

In another alternative embodiment, blind calculation of the shortening filter 108 can be used for the channel estimation. The blind calculation can include blind adaptive methods to perform without explicit utilization of the channel estimation unit 110. The blind calculation can require use of training sequences to train initial coefficients of the shortening filter 108.

Calculation and training of the shortening filter 108 can require an estimate of the raw channel impulse response of the communication channel 106 by the channel estimation unit 110. The raw channel impulse response can be required for calculation of the filter coefficients 222 by the filter coefficient calculator 210 and signal demodulation by the data demodulation unit 112. The raw channel impulse response obtained with the shortening filter 108 present in the time-domain data path of the receiver 114 will be described next.

The channel impulse response of the equivalent channel 104 can be shortened by inserting the shortening filter 108 in the time-domain data path of the receiver 114. The shortening filter 108 can be controlled by the filter coefficients 222 and filter tap delays 226. The filter tap delays 226 are defined as time-shifts of the shortening filter 108.

A shortening filter impulse response, depicted as the filter frequency response 216, can be cancelled in the frequency domain to deliver the raw channel impulse response 220. The raw channel impulse response 220 can be delivered to blocks, including the channel estimation unit 110 and the data demodulation unit 112, in the receiver 114.

The filter impulse response can be cancelled in the frequency domain to provide shortening-filter transparency to other blocks, such as automatic gain control and automatic frequency control, in the receiver 114 to mitigate the impact of inclusion or exclusion of the shortening filter 108 in the time-domain data path of the receiver 114. With processing of the shortening filter 108 and subsequent cancellation of the filter frequency response 216, the receiver 114 can be able to estimate the raw channel impulse response resulting in removal of the inter-symbol interference and the inter-carrier interference thereby eliminating signal quality degradation.

The filter coefficients 222 and the filter tap delays 226 of the shortening filter 108 can optionally be used to calculate the filter frequency response 216 without using the first process unit 206. The filter frequency response 216 can be used to cancel out the effects of the shortening filter 108 from the equivalent channel 104 to calculate the raw channel impulse response 220. The filter frequency response 216 cancelled out in the frequency domain allows signal processing to be done in both time and frequency domains.

The channel estimation unit 110 can obtain or perform estimation of the raw channel impulse response regardless of the presence of the shortening filter 108 in the time-domain data path of the receiver 114. The information based on the estimation of the raw channel impulse response can be used in the calculation of the filter coefficients 222 or for an update of the shortening filter 108 with new estimation of the raw channel impulse response.

As an example, the present invention can include maximum shortening signal to noise ratio optimization to improve efficiency of the shortening filter 108 thereby effectively solving the optimization problem related to channel shortening.

Each of blocks described above including the filter frequency response calculator 204, the first process unit 206, the filter frequency removal unit 208, and the filter coefficient calculator 210 can be implemented in hardware, software, or a combination thereof. For example, each of the blocks can be implemented in hardware, hardware with a processor, or a processor with hardware accelerator blocks in the processor.

It has been discovered that the shortening filter 108 processed in the time domain before the first process unit 206 is executed reduces processing power and complexity necessary to process the received signal after the first process unit 206 is executed compared to previous methods in other communication systems in which all signal processing has been done in the frequency domain after fast Fourier transform is executed.

It has been unexpectedly found that the filter coefficients 222 and the filter tap delays 226 updated only when certain conditions are met as opposed to previous methods in other communication systems thereby provides power consumption reduction resulting in improved reliability.

It has been unexpectedly determined that the filter frequency response 216 calculated optionally without using the first process unit 206 reduces processing power, processing time, energy consumption, and heat dissipation as well as reduces time, material, and cost necessary to manufacture the communication system 100.

It has been unexpectedly recognized that the outputs of the channel estimation unit 110 to be used for the calculation of the filter coefficients 222 without initial values improves reliability for signal transmission in communication systems that do not have training sequences for calculation of coefficients by providing an adaptive routine that places less importance on the initial values that are required in estimation methods including blind calculation.

Figure 3:
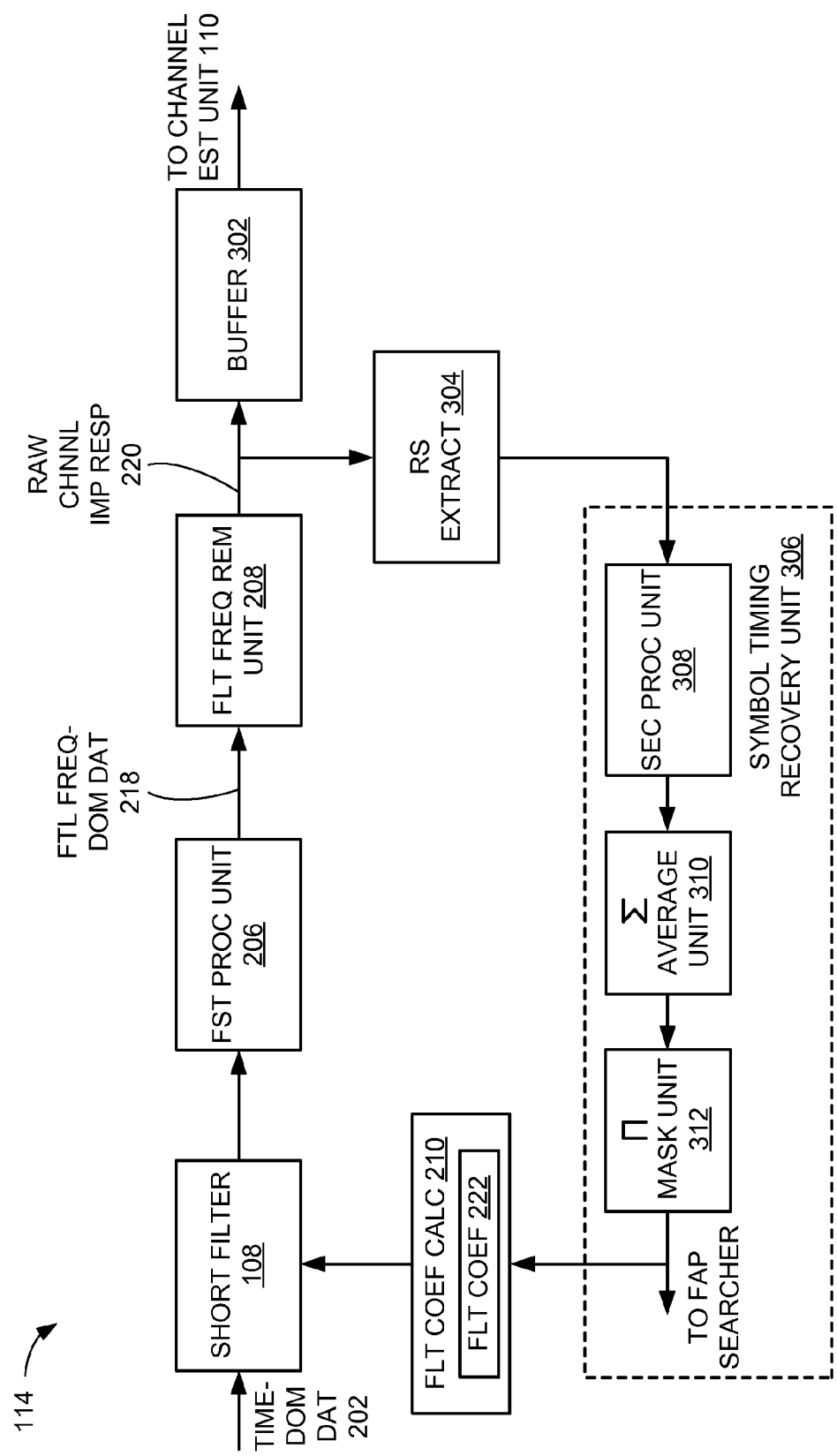
FIG. 3 is an example hardware block diagram of signal processing in the receiver.

Referring now to FIG. 3, therein is shown an example hardware block diagram of signal processing in the receiver 114. The example hardware block diagram depicts the receiver 114 having the shortening filter 108 receiving the time-domain data 202 and coupled to the first process unit 206. The receiver 114 can include the filter frequency removal unit 208 for removal of the filter frequency response 216 of FIG. 2 from the filter frequency-domain data 218.

The receiver 114 can include a buffer 302 to store data samples before demodulation is affected by the raw channel impulse response 220. For example, the buffer 302 can represent a post fast Fourier transform data buffer.

The receiver 114 can include a reference signal extractor 304 coupled to the filter frequency removal unit 208. The reference signal extractor 304 is defined as a logical component that extracts reference signals from a data frame. The reference signal extractor 304 can extract reference signals from a data frame from the raw channel impulse response 220.

The receiver 114 can include a symbol timing recovery unit 306 (STR) coupled to the filter coefficient calculator 210 and the reference signal extractor 304. The symbol timing recovery unit 306 is defined as a logical component that performs timing recovery and shortening filter calculation. The symbol timing recovery unit 306 can include a second process unit 308, an average unit 310, and a mask unit 312.

The reference signal extractor 304 can represent a part of the channel estimation unit 110. The symbol timing recovery unit 306 can represent a separate unit that is not a part of the channel estimation unit 110 and can perform channel estimation independently.

The second process unit 308 determines a time-domain component or representation of the signal output from the reference signal extractor 304. The second process unit 308 can be implemented in hardware, software, or a combination thereof. For example, the second process unit 308 can include a function or a method including inverse fast Fourier transform (IFFT).

The average unit 310 computes an average of channel impulse responses (CIR) of the communication channel 106 of FIG. 1 to improve or increase accuracy for the channel estimation. The mask unit 312 performs masking of the output of the average unit 310 by using a time-domain window to filter out undesired components. The output of the mask unit 312 can be sent to the filter coefficient calculator 210 and a first arriving path (FAP) searcher for further processing.

One purpose of the channel estimation in the present invention is to estimate delays and strengths of paths outside the cyclic prefix 118 of FIG. 1. For example, the channel estimation can represent a reference signal (RS) based channel estimation having limited delay ranges of channel impulse response estimation due to a reference signal puncturing pattern.

With an interpolation between reference signals in consecutive reference signal-carrying orthogonal frequency-division multiplexing symbols, a reference signal puncturing pattern can cover every three subcarriers. For example, a maximum value of the channel delay spread 224 of FIG. 2 of a channel can be estimated as approximately 22 microseconds (us), which is approximately ⅓ of an orthogonal frequency-division multiplexing symbol.

The channel estimation can include the average unit 310 to reduce the inter-symbol interference. The channel estimation can evaluate full-size FFT with the second process unit 308. The channel estimation can perform channel impulse responses averaging and masking with the average unit 310 and the mask unit 312, respectively. Thus, the channel estimation in the symbol timing recovery unit 306 can be adopted for shortening filter calculation.

When the shortening filter 108 is included in the time-domain data path of the receiver 114, a fast Fourier transform of the output of the shortening filter 108 can be calculated to determine the filter frequency response 216. The raw channel impulse response 220 can be generated with a product of a reciprocal of the filter frequency response 216 and the filter frequency-domain data 218 to provide shortening filter transparency to subsequent processing modules.

The data frame from the raw channel impulse response 220 can include common pilots. As a result, a wide range of Doppler can be covered. For example, the raw channel impulse response 220 can include a common pilot that is available twice per a long-term evolution frame structure slot.

The receiver 114 can include a Doppler estimation block (not shown), which can be reused from frequency domain pilot processor (FDP). For example, a short-term correlation mode of 0.5 milliseconds (ms) can be performed to estimate a Doppler frequency in the 2-kilohertz (kHz) range. Also for example, a long-term correlation mode of 5 milliseconds can be performed to increase the accuracy for small Dopplers. Based on the curve for long-term correlation, Doppler can be reliably estimated in the range of 0 hertz (Hz) 20 hertz, which is a decision region of interest.

For example, consider the shortening filter 108 functioning as a two-tap shortening filter in the time-domain data path of the receiver 114. If the conditions for using the shortening filter 108 are satisfied, the shortening filter 108 can be used. Otherwise, the shortening filter 108 can be bypassed. When the shortening filter 108 is used, raw channel estimation can still be required to calculate and/or update the filter coefficients 222.

Also for example, consider the following scheme for the filter frequency correction. Since the shortening filter 108 functioning only as a two-tap shortening filter is considered, the correction can be simple. The filter frequency response 216 can include a flat term and a sine wave. A correction term of the sine wave can be calculated in hardware by using a coordinate rotation digital computer (CORDIC). A constant term can be added to the output of the coordinate rotation digital computer so that the overall correction can be calculated. An inverse of the overall correction can be applied to each of active subcarriers.

As an example, the raw channel estimation can be obtained by the channel estimation unit 110 regardless of the presence of the shortening filter 108 as the filter frequency response 216 can be cancelled. The raw channel estimation can be used for data demodulation as the shortening filter 108 has been effectively removed from the time-domain data path of the receiver 114. The raw channel estimate can also be used by the channel estimation unit 110 in the symbol timing recovery unit 306 to perform calculation for the shortening filter 108.

As an implementation example, the channel estimation unit 110 in the symbol timing recovery unit 306 can include a channel impulse responses search window that can be programmable with values ranging from ⅙ to ⅓ of an orthogonal frequency-division multiplexing symbol duration. Thus, paths with delay spreads up to a third of an orthogonal frequency-division multiplexing symbol duration can be estimated.

Time averaging of the channel impulse responses in the average unit 310 for the calculation of the shortening filter 108 is assumed in-line with or the same as time-averaging constants in the symbol timing recovery unit 306 as both processes have the same purpose of improving the channel estimation. With time averaging, the channel estimation can be slower than that used for data demodulation and can cover smaller ranges of Doppler.

In frequency domain pilot processor, the Doppler can be estimated with a fast correlations and a slow correlation. The slow correlation can have duration of 5 milliseconds. The slow correlation can be used as a Doppler estimate for calculation of the shortening filter 108 rather than the fast correlation due to averaging to increase accuracy requirements for the channel estimation.

The channel estimation operated on a sampling rate (Ts) provides improved calculation of time fixes for path components compared to other estimation methods. The channel estimation can improve performance with faster channel estimation with pilots available twice per slot in the data frame. The channel estimation can provide less susceptibility to inter-cell interference as there are 6 different pilot start positions based on cell group id.

Each of blocks described above including the buffer 302, the reference signal extractor 304, the symbol timing recovery unit 306, having the second process unit 308, the average unit 310, and the mask unit 312, can be implemented in hardware, software, or a combination thereof. For example, each of the blocks can be implemented in hardware, hardware with a processor, or a processor with hardware accelerator blocks in the processor.

It has been discovered that post-processing by re-using the average unit 310 and the mask unit 312 in the symbol timing recovery unit 306 improves the channel estimation for the communication channel 106.

Figure 4:
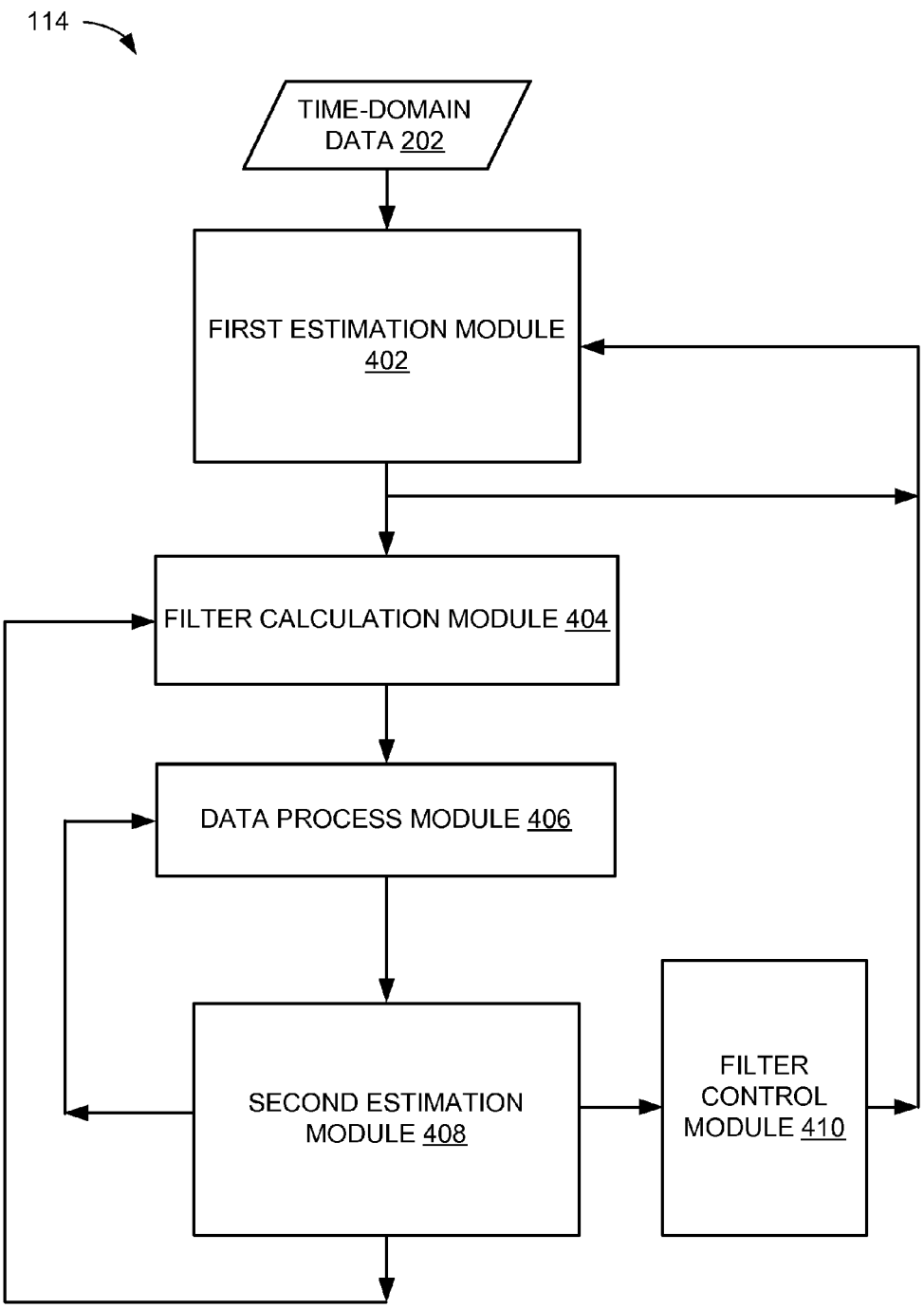
FIG. 4 is a flowchart of signal processing of the receiver.

Referring now to FIG. 4, therein is shown a flowchart of signal processing of the receiver 114. The receiver 114 can include a first estimation module 402 coupled to a filter calculation module 404. The receiver 114 can include a data process module 406 coupled to the filter calculation module 404.

The receiver 114 can include a second estimation module 408 coupled to the data process module 406 and the filter calculation module 404. The receiver 114 can include a filter control module 410 coupled to the second estimation module 408 and the first estimation module 402.

The first estimation module 402 is defined as a logical block that receives the time-domain data 202 and performs the channel estimation based on the time-domain data 202 for calculation of the filter coefficients 222 of FIG. 2. The first estimation module 402 calculates the channel impulse response of the communication channel 106 of FIG. 1 with the shortening filter 108 of FIG. 1 off or disabled.

The first estimation module 402 can evaluate the channel delay spread 224 of FIG. 2 based on the cyclic prefix 118 of FIG. 1. If the channel delay spread 224 is greater than the cyclic prefix 118, the first estimation module 402 can enable the filter calculation module 404 to perform calculation for the shortening filter 108. If the channel delay spread 224 is less than or equal to the cyclic prefix 118, the first estimation module 402 can continue to perform the channel estimation.

The first estimation module 402 can be implemented with the channel estimation unit 110 of FIG. 1. For example, the channel estimation unit 110 can calculate the channel impulse response of the communication channel 106.

The filter calculation module 404 is defined as a logical block that performs calculation for the shortening filter 108. The filter calculation module 404 can calculate the filter coefficients 222. The filter calculation module 404 can calculate the filter frequency response 216 of FIG. 2.

The filter calculation module 404 can remember a channel profile by storing the channel profile in a storage unit (not shown), which is a memory device that is used to store control and data information. For example, the storage unit can be a volatile memory, a nonvolatile memory, an internal memory, an external memory, or a combination thereof.

The filter calculation module 404 can be implemented with the filter coefficient calculator 210 of FIG. 2 and the filter frequency response calculator 204 of FIG. 2. For example, the filter coefficient calculator 210 can be used to calculate the filter coefficients 222. Also for example, the filter frequency response calculator 204 can calculate the filter frequency response 216.

The data process module 406 is defined as a logic block that filters the time-domain data 202 based on the filter coefficients 222 calculated by the filter calculation module 404. The data process module 406 can reduce the power of the channel taps outside the cyclic prefix 118 in the time-domain data 202.

The data process module 406 can determine the frequency components based on the discrete data values from the filter time-domain data 214 of FIG. 2. The data process module 406 can cancel or remove the filter frequency response 216 in frequency domain.

The data process module 406 can be implemented with the shortening filter 108, the first process unit 206 of FIG. 2, and the filter frequency removal unit 208 of FIG. 2. For example, the shortening filter 108 can filter the time-domain data 202 based on the filter coefficients 222 calculated by the filter calculation module 404. Also for example, the first process unit 206 can determine the frequency components based on the discrete data values from the filter time-domain data 214. Also for example, the filter frequency removal unit 208 can cancel or remove the filter frequency response 216 in frequency domain.

The second estimation module 408 is defined as a logic block that receives the output of the data process module 406 and performs the channel estimation based on the output of the data process module 406 for calculation of the filter coefficients 222. The second estimation module 408 calculates the response of the communication channel 106 with the filter frequency response 216 of the shortening filter 108 removed.

The second estimation module 408 can evaluate the channel delay spread 224 based on the cyclic prefix 118. If the channel delay spread 224 is greater than the cyclic prefix 118 and a raw channel profile is changed, the second estimation module 408 can enable the filter calculation module 404 to perform calculation for the shortening filter 108.

If the channel delay spread 224 is greater than the cyclic prefix 118 and a raw channel profile is unchanged, the second estimation module 408 can enable the data process module 406 to filter the time-domain data 202 based on the filter coefficients 222 calculated by the filter calculation module 404. If the channel delay spread 224 is less than or equal to the cyclic prefix 118, the second estimation module 408 can enable the filter control module 410 to perform further control of the shortening filter 108.

The second estimation module 408 can be implemented with the channel estimation unit 110. For example, the channel estimation unit 110 can calculate the channel impulse response of the equivalent channel 104.

The filter control module 410 is defined as a logical block that controls the shortening filter 108, the filter frequency response calculator 204, and the filter frequency removal unit 208. The filter control module 410 can turn off or disable the shortening filter 108. The filter control module 410 can turn off or disable the filter frequency response calculator 204 and the filter frequency removal unit 208 to stop cancelling of or disable the removal of the filter frequency response 216. The filter control module 410 can enable the first estimation module 402 to perform the channel estimation based on the time-domain data 202 for calculation of the filter coefficients 222.

The filter control module 410 can gradually switch the shortening filter 108 on or gradually switch the shortening filter 108 off to minimize the impact on tracking loops. The term "gradually switch" is defined as change in a small or incremental amount instead of abruptly or immediately change. For example, the shortening filter 108 can be gradually switched off by gradually reducing the magnitude of some or all of filter taps of the shortening filter 108 to zero.

The receiver 114 can compute the filter frequency response 216 and remove the effect of the shortening filter 108 in the frequency domain by dividing the filter frequency-domain data 218 of FIG. 2 by the filter frequency response 216. As a result, the channel estimation unit 110 can estimate the raw channel impulse response and calculate and/or update the filter coefficients 222 effectively regardless of the presence of the shortening filter 108 in the time-domain data path of the receiver 114.

The flowchart depicts an apparatus for implementation of the receiver 114 including the shortening filter 108 controlled with programmable values for the filter tap gains, the filter coefficients 222, and the filter tap delays 226 of FIG. 2 of the filter taps of the shortening filter 108. The programmable values can be generated by the filter calculation module 404.

Each of modules described above including the first estimation module 402, the filter calculation module 404, the data process module 406, the second estimation module 408, and the filter control module 410 can be implemented in hardware, software, or a combination thereof. For example, each of the modules can be implemented in hardware, hardware with a processor, or a processor with hardware accelerator blocks in the processor.

It has been discovered that the data process module 406 provides improved performance for the first estimation module 402 and the second estimation module 408 to estimate the raw channel impulse response even in the presence of the shortening filter 108 by cancelling or removing the filter frequency response 216 in frequency domain.

Figure 5:
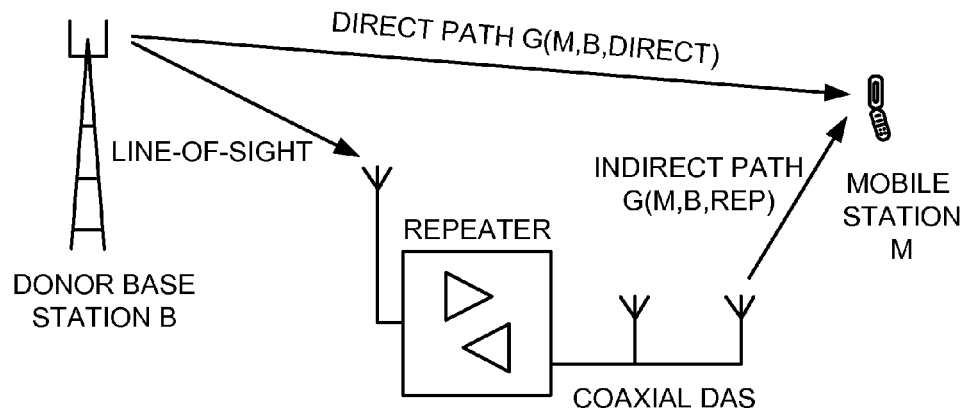
FIG. 5 is an application example of signal processing.

Referring now to FIG. 5, therein is shown an application example of signal processing. FIG. 5 illustrates an example of a two-path channel model where a mobile station experiences direct line-of-sight component from a base station and an indirect path from a repeater.

A benefit of an application of the shortening filter 108 of FIG. 1 can be provided, since a path separation, depicted as an indirect path with a repeater delay, can include a delay that exceeds duration of the cyclic prefix 118 of FIG. 1. The shortening filter 108 can eliminate the interference terms for the channel taps outside the cyclic cycle.

Figure 6:
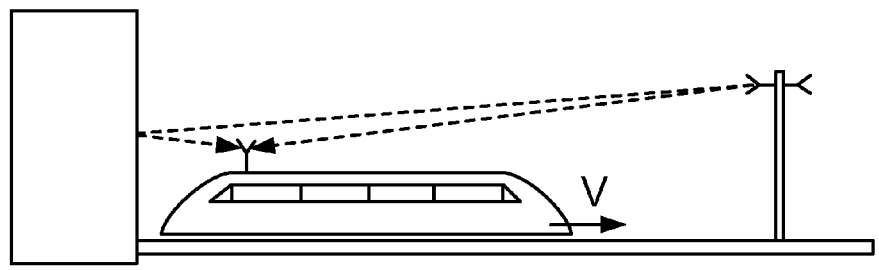
FIG. 6 is another application example of signal processing.

Referring now to FIG. 6, therein is shown another application example of signal processing. FIG. 6 illustrates another example of a two-path scenario where a mobile receives a line-of-sight component from a base station and a reflection component from a natural fixture.

The shortening filter 108 of FIG. 1 can be used in a repeater scenario where a mobile velocity is likely to be lower, or even static, and hence this is a lower Doppler scenario. If a train moves slowly, such as during approach to or departure from the base station, channel shortening with the shortening filter 108 can be beneficial.

Let us consider, for example, a case of the two-path channel scenario with the repeater. As a specific example, let us consider two cases of excess delay introduced by the repeater as follows.

Case 1: A cell coverage size is 1000 meters (m). A repeater coverage size is 500 meters. A length of an optic fiber between a base station (BS) and a repeater is 1500 meters. A delay introduced by Radio frequency (RF) elements of the repeater is 5 microseconds. Then, a delay of the repeater is $$\left(\frac{1500 \text{ m}}{2 \times 10^8 \text{ m/s}} + \frac{500 \text{ m}}{3 \times 10^8 \text{ m/s}} + 5 \text{ }\mu s\right) - \frac{1000 \text{ m}}{3 \times 10^8 \text{ m/s}} = 10.8 \text{ }\mu s$$

Case 2: A cell coverage size is 3000 meters. A repeater coverage size is 1000 meters. A length of an optic fiber between a base station and a repeater is 6000 meters. A delay introduced by Radio frequency elements of the repeater is 5 microseconds. Then, a delay of the repeater is $$\left(\frac{6000 \text{ m}}{2 \times 10^8 \text{ m/s}} + \frac{1000 \text{ m}}{3 \times 10^8 \text{ m/s}} + 5 \text{ }\mu s\right) - \frac{3000 \text{ m}}{3 \times 10^8 \text{ m/s}} = 28.3 \text{ }\mu s$$

Although a network planning should insert a sufficient number of the cyclic prefix 118 of FIG. 1 to account for repeater delays that can be quite large as encountered by operators, it is possible that a path component escapes or having a delay exceeding the cyclic prefix 118. Under these circumstances, escaping component of a multipath can seriously degrade the system. As an additional consideration, a large number of repeaters can be used to cover holes in the coverage and thus not tested as thoroughly as cell sites. Therefore, it is beneficial for user experience to have a capability to remedy such scenarios with a large value of the channel delay spread 224 of FIG. 2 at the point of user equipment (UE).

Figure 7:
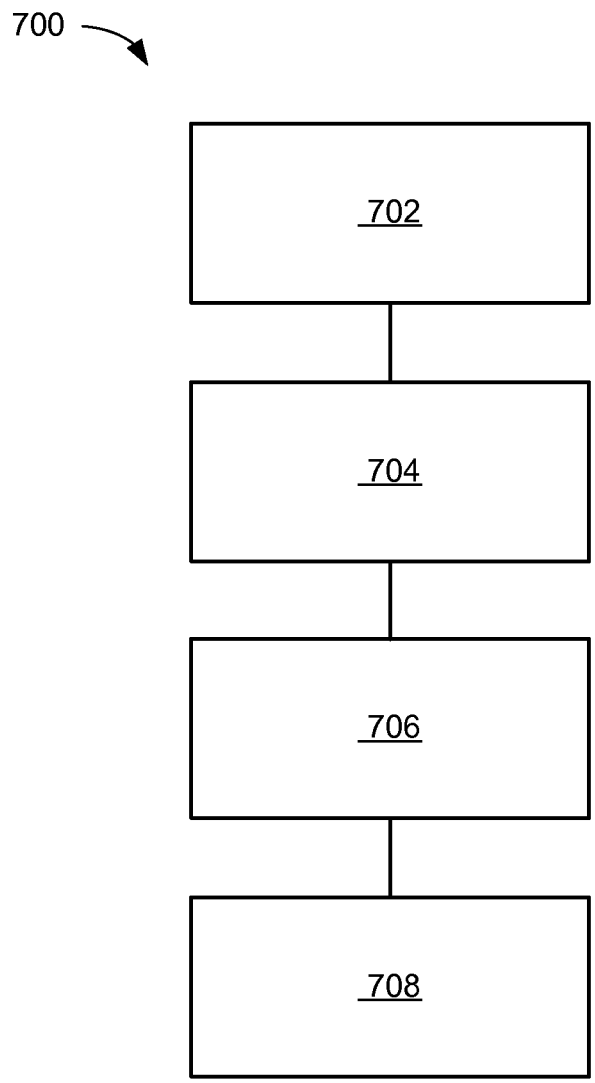
FIG. 7 is a flow chart of a method of operation of a communication system in a further embodiment of the present invention.

Referring now to FIG. 7, therein is shown a flow chart of a method 700 of operation of a communication system in a further embodiment of the present invention. The method 700 includes: generating a filter impulse response and a filter time-domain data with a shortening filter in a block 702; generating a filter frequency response based on the filter impulse response with a filter frequency response calculator in a block 704; generating a filter frequency-domain data based on the filter time-domain data with a first process unit in a block 706; and generating a raw channel impulse response with a filter frequency removal unit for removing the filter frequency response from the filter frequency-domain data in a block 708.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a communication system comprising:
   generating a filter impulse response and a filter time-domain data with a shortening filter;
   generating a filter frequency response based on the filter impulse response with a filter frequency response calculator;
   generating a filter frequency-domain data based on the filter time-domain data with a first process unit; and
   generating a raw channel impulse response with a filter frequency removal unit for removing the filter frequency response from the filter frequency-domain data.

2. The method as claimed in claim 1 wherein generating the raw channel impulse response includes generating the raw channel impulse response with a product of the filter frequency-domain data and a reciprocal of the filter frequency response.

3. The method as claimed in claim 1 further comprising generating a filter coefficient based on the raw channel impulse response.

4. The method as claimed in claim 1 further comprising gradually switching the shortening filter for generation of the filter time-domain data.

5. The method as claimed in claim 1 wherein generating the filter frequency response includes transforming the filter impulse response from time domain to frequency domain.

6. A method of operation of a communication system comprising:
   generating a filter impulse response and a filter time-domain data with a shortening filter for removing interferences from a time-domain data;
   generating a filter frequency response based on the filter impulse response with a filter frequency response calculator;
   generating a filter frequency-domain data based on the filter time-domain data with a first process unit; and
   generating a raw channel impulse response with a filter frequency removal unit for removing the filter frequency response from the filter frequency-domain data.

7. The method as claimed in claim 6 further comprising:
   evaluating a channel delay spread of the time-domain data;
   wherein:
   generating the raw channel impulse response includes generating the raw channel impulse response based on the channel delay spread with a product of the filter frequency-domain data and a reciprocal of the filter frequency response.

8. The method as claimed in claim 6 further comprising generating a filter coefficient and a filter tap delay based on the raw channel impulse response.

9. The method as claimed in claim 6 further comprising gradually switching the shortening filter for generation of the filter time-domain data with a channel delay spread less than a cyclic prefix.

10. The method as claimed in claim 6 wherein generating the filter frequency response includes transforming the filter impulse response from time domain to frequency domain with a fast Fourier transform.

11. A communication system comprising:
- a shortening filter for generating a filter impulse response and a filter time-domain data;
- a filter frequency response calculator, coupled to the shortening filter, for generating a filter frequency response based on the filter impulse response;
- a first process unit, coupled to the shortening filter, for generating a filter frequency-domain data based on the filter time-domain data; and
- a filter frequency removal unit, coupled to the filter frequency response calculator, for generating a raw channel impulse response with the filter frequency response removed from the filter frequency-domain data.

12. The system as claimed in claim 11 wherein the filter frequency removal unit is for generating the raw channel impulse response with a product of the filter frequency-domain data and a reciprocal of the filter frequency response.

13. The system as claimed in claim 11 further comprising a filter coefficient calculator, coupled to the shortening filter, for generating a filter coefficient based on the raw channel impulse response.

14. The system as claimed in claim 11 further comprising a filter control module, coupled to the filter frequency response calculator, for gradually switching the shortening filter for generation of the filter time-domain data.

15. The system as claimed in claim 11 wherein the filter frequency response calculator is for transforming the filter impulse response from time domain to frequency domain.

16. The system as claimed in claim 11 wherein the shortening filter is for generating the filter impulse response and the filter time-domain data with interferences removed from a time-domain data.

17. The system as claimed in claim 16 further comprising:
- a channel estimation unit, coupled to the filter frequency removal unit, for evaluating a channel delay spread of the time-domain data;

wherein:
- the filter frequency removal unit is for generating the raw channel impulse response based on the channel delay spread with a product of the filter frequency-domain data and a reciprocal of the filter frequency response.

18. The system as claimed in claim 16 further comprising a filter coefficient calculator, coupled to the shortening filter, for generating a filter coefficient and a filter tap delay based on the raw channel impulse response.

19. The system as claimed in claim 16 further comprising a filter control module, coupled to the filter frequency response calculator, for gradually switching the shortening filter for generation of the filter time-domain data with a channel delay spread less than a cyclic prefix.

20. The system as claimed in claim 16 wherein the filter frequency response calculator is for transforming the filter impulse response from time domain to frequency domain with a fast Fourier transform.

\* \* \* \* \*